United States Patent [19]
Kreisel et al.

[11] Patent Number: 6,088,516
[45] Date of Patent: Jul. 11, 2000

[54] METHOD FOR CLONING A SOURCE APPLICATION WITH ASSIGNMENT OF UNIQUE IDENTIFIER TO CLONE APPLICATION

[76] Inventors: Glenn M. Kreisel, 311 E. Spruce St.; Steven S. Saroff, 1901 Missoula Ave., both of Missoula, Mont. 59802

[21] Appl. No.: 08/898,884

[22] Filed: Jun. 27, 1997

Related U.S. Application Data

[63] Continuation of application No. 08/413,388, Mar. 30, 1995, abandoned.

[51] Int. Cl.[7] .................................................. G06F 3/00
[52] U.S. Cl. ............................................. 395/200.51
[58] Field of Search ................... 374/93.24; 364/242.94; 395/200.51

[56] References Cited

U.S. PATENT DOCUMENTS

| | | | |
|---|---|---|---|
| 4,438,492 | 3/1984 | Harmon, Jr. et al. | 395/591 |
| 4,545,011 | 10/1985 | Lyon et al. | 395/183.19 |
| 4,582,959 | 4/1986 | Myslinski et al. | 385/73 |
| 4,853,888 | 8/1989 | Lata et al. | 345/172 |
| 4,882,705 | 11/1989 | Yasue | 395/185.06 |
| 5,012,233 | 4/1991 | Poulsen, Jr. | 340/825.18 |
| 5,155,847 | 10/1992 | Kirouac et al. | 395/200.51 |
| 5,247,683 | 9/1993 | Holmes et al. | 395/200.51 |
| 5,276,801 | 1/1994 | Heyen et al. | 345/501 |
| 5,287,407 | 2/1994 | Holmes | 380/4 |
| 5,293,250 | 3/1994 | Okumura et al. | 358/402 |
| 5,325,310 | 6/1994 | Johnson et al. | 395/200.36 |
| 5,382,951 | 1/1995 | White et al. | 340/825.52 |
| 5,500,893 | 3/1996 | Onosaka | 379/396 |

OTHER PUBLICATIONS

The C Users Journal, Oct., 1992, vol. 10, pp. 55–60.
"Writing a Setup Application for Windows in C", by Herman Rodent, Feb. 10, 1993, Microsoft Development Library.
"Introduction", 1992, 1993, Microsoft Development Library.
"Default File Settings", 1992, 1993, Microsoft Development Library.
"Online, on the go with Wireless Envoy", by J. Hutsko, PC World, V. 12, p. 78, Apr., 1994.
"Equal Oppurtunity Service; Service Vendors Enmbrace . . . ", by R. Levine, Midrange Systems, vol. 5, p. 42, Sep., 1992.
"An Answering Machine for E–Mail", LAN Magazine, vol. 9, No. 5., p. 16, May, 1995.
"Default File Settings", 1992, 1993, Microsoft Development Library.
J. Hutsko, "Online, on the go with wireless Envoy, " PC World, v 12 p 78, Apr. 1994.

*Primary Examiner*—Thomas C. Lee
*Assistant Examiner*—Anderson I. Chen
*Attorney, Agent, or Firm*—Shook, Hardy & Bacon LLP

[57] ABSTRACT

An electronic communications package is provided for use upon a plurality of terminals located remote from one another. The communications package provides an electronic mail system which allows a user at an authorized site to create an unlimited number of additional copies of the application package to be installed upon separate and remote terminals. Each copy created by an authorized "source" site, when recorded on a disk, is capable of installing itself onto another terminal through a self-installing routine. Copies of the application package which are created by a source terminal are considered "clones" and are afforded all of the communications capabilities of a source terminal when communicating with a source terminal. However, clone terminals are afforded limited communications capabilities with one another. The present communications package is further configured to inform a user when new mail messages are received by flashing one of the LEDs upon the keyboard, such as the Caps Lock LED, the Nums Lock LED, and the Scroll Lock LED. This flashing LED is turned on when new messages are received and is turned off when a user views at least one of the messages newly received. The present communications system utilizes a unique calling technique implemented over non-dedicated phone lines to enable a terminal being called to identify the call as coming from a related communications packet.

12 Claims, 6 Drawing Sheets

METHOD FOR CLONING A SOURCE APPLICATION WITH ASSIGNMENT OF UNIQUE IDENTIFIER TO CLONE APPLICATION

This is a continuation of application Ser. No. 08/413,388, filed Mar. 30, 1995, now abandoned.

FIELD OF THE INVENTION

The present invention generally relates to an electronic communications network commonly referred to as an E-mail system, in which authorized users are afforded the ability to create multiple network sites and in which a visual indicator is provided upon the keyboard to identify new messages.

BACKGROUND OF THE INVENTION

In the past, many computer networks have been proposed that allow terminals at remote individual sites to communicate with one another through electronic mail (E-mail) by transmitting messages between the sites via modems and a common protocol. To communicate through E-mail, terminals must have the same E-mail package installed thereon. However, existing E-mail systems have proven unduly difficult and inconvenient to install. When it is desirable to install an E-mail system, the necessary software must be installed upon each computer (or at each site).

Such installation, heretofore, is carried out by a service person and the like. Thus, when two parties desire to utilize an E-mail system, they must solicit the assistance of a support person to install the necessary software. Similarly, this support person must be utilized when it is desirable to add new parties to the system. Alternatively, each user must purchase and install a copy of the same E-mail software package in order for these users to communicate with one another. When it is desirable to add a new site to the E-mail network, a new copy of the software package must be purchased from the original seller or an authorized agent. This purchasing practice is inconvenient and often serves as a deterrent to adding the new site.

Past E-mail systems have provided a visual indicator upon the computer screen to inform the user when a new E-mail message has been received. However, the monitor or display screen for the computer must be turned on and illuminated in order for the user to view this indicator and to determine whether new messages have been received. Thus, when a user arrives in the morning or at any time when the monitor is turned off, the user must turn the monitor on to identify new messages.

Often users leave the computer on over night to receive incoming mail from remote sites. Today, most computers include a "screen saver" function whereby the monitor or screen automatically turns itself off if not used for a preset period of time. Thus, when a mail message is received, the user must press a key on the keyboard in order to activate the monitor, prior to ascertaining whether new mail exists. In either of the foregoing situations, the user is required to activate the computer to identify new mail which is inconvenient.

A need remains within the industry for an improved electronic mail system which is easily installed and which affords the user a visual indication of new mail at all times. It is an object of the present invention to overcome the foregoing disadvantages.

SUMMARY OF THE INVENTION

It is an object of the present invention to provide an electronic mail system which allows authorized users to create an unlimited number of additional copies of the software package, each copy of which is uniquely identified and is able to communicate with the authorized user's system.

It is a corollary object of the present invention to provide an electronic mail software package stored upon a computer disk which is capable of reproducing itself onto other disks including the ability to be self-installing upon other terminals.

It is another object of the present invention to provide an electronic mail system having source/parent and clone/child disks, wherein a site installed with a clone/child disk is afforded the same capabilities as a site installed with a source/parent disk when the clone/child site communicates with a source/parent site.

It is a further object of the present invention to provide an electronic communication system which is able to inform a user of new messages while the monitor is turned off.

Another object of the present invention is to provide a visual indicator upon the keyboard for a variety of items concerning the status of the computer, such as receipt of incoming mail and the like.

Finally, it is an object of the present invention to provide a unique signal for establishing a link between sites whereby the sites communicate over a non-dedicated phone line and establish a link therebetween based on a unique sequence of rings.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1A:
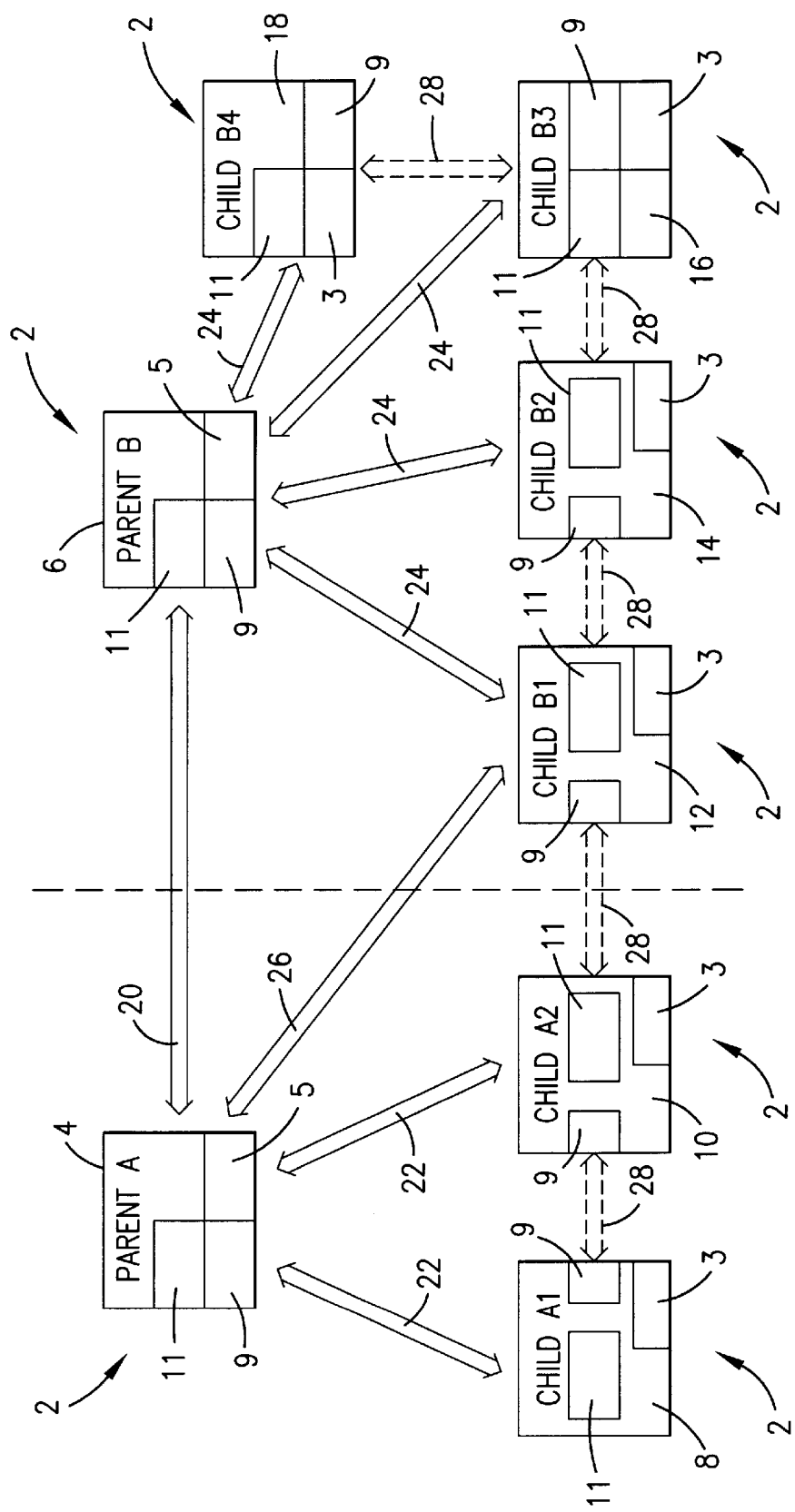
FIG. 1a illustrates a block diagram of a network containing multiple terminals which communicate and interact with one another according to the present invention.

FIG. 1 illustrates a block diagram of a system provided according to the present invention which includes a plurality of computer terminals 2 remotely located from one another, with each of the terminals having an electronic communications package 3 or 5 installed thereon. Each terminal 2 may be configured from a variety of computer systems, such as a personal computer (e.g., an IBM PC as sold by IBM, a Macintosh as sold by Apple, and the like).

Figure 1B:
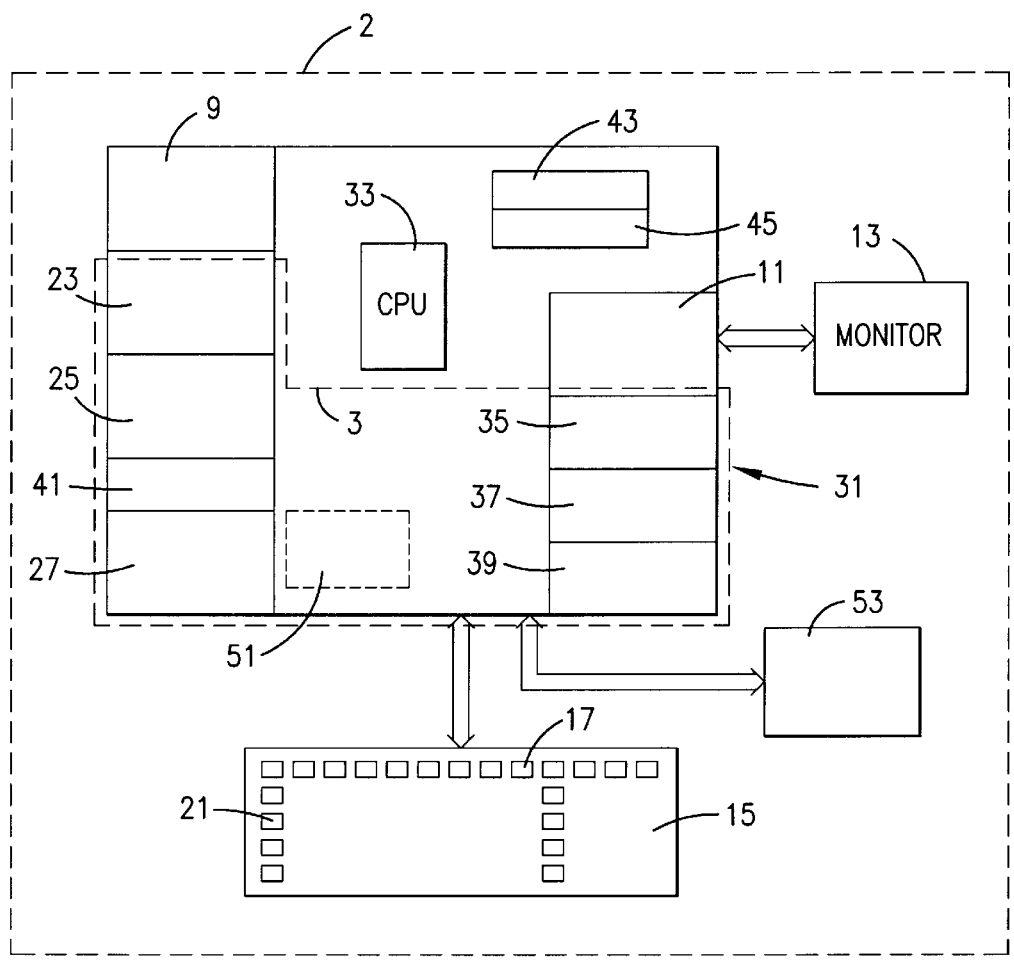
FIG. 1b illustrates a block diagram of a source/parent terminal configured to process communications mail with other terminals according to the present invention.

As shown in FIG. 1b, each terminal 2 is configured to operate with a graphics interface 11, such as "Windows" by Microsoft, "Windows NT" by Microsoft, the Macintosh operating system, and the like. Each terminal 2 further includes a monitor 13 and keyboard 15, such as used with conventional personal computers. Each terminal 2 includes a modem 9 to transmit and receive communications via the phone links. The modem 9 may communicate via dedicated or non-dedicated phone lines with other terminals. Each keyboard 15 includes at least three LEDs thereon, namely a Scroll Lock LED 17, a Num Lock 19, and a Caps Lock LED 21. The communications package 3 includes memory containing an incoming queue 23 and an outgoing queue 25 to store messages and/or data files to be transmitted to and received from other terminals 2. Each queue stores a transmit/receive record associated with each message and/or data file. The transmit/receive record contains unique information concerning the destination site (for outgoing mail) or source site (for incoming mail), the type of message, the time received (for incoming mail), the time to transmit (for outgoing mail), and the like. A data base 27 is also included that stores a plurality of site records 29, each of which contains unique information about other sites necessary to communicate with the site, such as a site phone number, a site address and the like.

The communications package 3 further includes a communications control block 31 which directs operation of the terminal CPU 33 in connection with the E-mail network. By way of example, the control block 31 may represent a plurality of files stored in memory which are accessed by the CPU 33 to operation the communications package 3. The control block 31 includes an executable file segment 35 which contains commands directing the CPU 33 on how to control the E-mail system, a help file segment 37 accessed by the CPU 33 to assist a user, and a set up file segment 39 which automatically installs the communications package 3 on the terminal 2. The communications package 3 further includes an identification block 41 which contains a serial number uniquely identifying the terminal containing the package 3. The block 41 further includes security information used to prevent unauthorized copies of the package 3 from being created.

The communications package further includes a clone/child creation block 51 which affords a user the option of creating additional copies of the package upon disks loaded in a disk drive 53. The creation block 51 is illustrated in dashed lines since this ability is not offered by clone communications packages. For instance, during operation, the child creation option may be illustrated to a user of a source terminal as a menu option. However, this menu option would be omitted from the menus displayed to a user of a clone communications package. The creation option may be omitted from child sites by (1) not copying the associated creation files to the disk containing the clone package; or (2) "masking" this option from the menu.

Two terminals 4 and 6 are installed with source/parent mail communications packages 5 and 7 and operate as source/parent sites (as explained below). The source application packages 5 and 7 also include a clone/child creation block 45 containing a random number generator 43. The block 45 is called by the user via the graphics interface 11 and directs the CPU 33 to copy the application package to a disk (as explained below). The creation block 45 also utilizes the random number generator 43 to create a unique identification block 41 for the application package written to the disk. The source terminals 4 and 6 utilize random number generators to create unique identifiers for clone/child terminals generated by the source terminal. A plurality of terminals 8–18 are installed with clone/child communications packages and operation as clone/child sites. The terms "parent" and "source" are used hereafter interchangeably, as are the terms "child" and "clone".

Source and clone sites are configured to operate in very similar manners, except that clone sites are afforded limited communications abilities with one another. Structurally a clone terminal resembles the source terminal shown in FIG. 1b, except that the clone terminal does not include the clone/child creation block 45. The clone terminal does include the application package 3, modem 9, graphics interface 11, CPU 33, monitor 13 and keyboard 15. Hence, clone sites are incapable of producing other clone communications packages. The parent terminals 4 and 6 include the ability to create clone/child communications packages that operate upon terminals 8 and 10 as explained below.

The source/parent terminals 4 and 6 communicate with one another via a communications link 20, while the source/parent terminal 4 communicates with clone/child terminals 8 and 10 via links 22. The source terminal 6 communicates with the clone terminals 12–18 via links 24. The communications links 20–28 may represent conventional, non-dedicated phone lines. Any source terminal may communicate with any clone terminal, regardless of whether the clone/child terminal is created by the source terminal. Hence, parent terminal 4 may communicate with any of the child terminals 12–18 (as illustrated by the communications link 26) even though parent terminal 6 facilitated the creation of the communications packages 7 installed on child terminals 12–18. Similarly, (while not illustrated literally), the parent terminal 6 may communicate with the child terminals 8 and 12. Child terminals are afforded limited communication with one another as evidenced by the communication links 28 provided in dashed lines.

The communications links 20–28 and the source and clone communications packets 5 and 7 afford a client/server relationship between any source/parent site and any clone/child site, wherein each clone/child site is afforded all of the communications capabilities of a source/parent site when a clone/child terminal communicates with a source/parent terminal. Each child terminal is afforded limited communications capabilities when communicating with another child terminal. During a communication between parent and child sites, either site may function to control all communications therebetween during the link. The site that initiates the call controls these communications. Hence, if a child terminal 12 initiates a call with a parent terminal 6, the child terminal 12 functions as the client/master terminal to control communications while the parent terminal 6 functions as the server/slave terminal. By way of example, the calling terminal confirms the identity of both terminals, transmits outgoing messages to the called terminal and polls the called terminal for messages to be sent to the calling terminal. When parent terminals 4 and 6 initiate calls to one another and to child terminals, the calling terminal functions as the master terminal.

Two terminals may connect with one another in a variety of ways, such as by "direct dialing" or by "logic dialing". Terminals may direct dial one another when connected to dedicated phone lines. When connecting through direct dialing the receiving terminal simply answers the phone every time it rings. The receiving terminal may also answer every call on a non-dedicated line and merely perform the functions of an answering machine. While answering the call, if the receiving terminal identifies a caller as another terminal, the receiving terminal then carries out communications therewith as explained below.

To direct dial, the calling terminal simply obtains the receiving site information (e.g., the site phone number). The receiving site is placed in a "waiting state" with its modem set to automatically answer. Hence, when a call is received, the called terminal simply answers the call.

Alternatively the terminals may connect through "logic dialing" wherein the calling terminal carries out a predefined sequence of rings separated by set delay intervals. The called or receiving terminal only answers the phone when this predefined sequence is identified. Logic dialing allows a terminal that is configured to operate the inventive communications package to share a phone line with another telecommunications device.

Table 1 set forth below illustrates the steps taken by a terminal initiating a call (the calling terminal) according to a "logic dialing" routine.

TABLE 1

| Step 1. | Obtain Receiving Site Info and Initiate Call |
| Step 2. | Allow Phone to Ring First Preset Number of Times |
| Step 3. | Hang Up Phone After # Rings |
| Step 4. | Wait Set Time and Redial Phone Number |
| Step 5. | Allow Phone to Ring Second Preset Number of Times |
| Step 6. | Repeat Steps 2–5 if Desired |
| Step 7. | ... |
| Step 8. | If No Answer Stop |
| Step 9. | If Answer Transfer E-Mail and Data Files |
| Step 10. | Return to Main Graphic Interface Routine |

To establish a link, when directed to do so by the user, the terminal 2 directs the modem 9 to initiate a phone call to a specified remote site. The phone number of the destination site is stored at the calling site within the data base 27 which contains a plurality of records, each of which relates to a different site. The record for each site includes the phone number for the site. Thus, when initiating a phone call, the modem of the calling terminal dials the phone number from this data base for the site to be called. The called site identifies the incoming phone call as one from a remote communications site based on a predefined unique sequence of rings, and only answers after receiving the sequence of rings.

As shown in Table 1, the calling terminal allows the phone at the called terminal to ring a predefined number of times (step 2), such as 3 times and hangs up (step 3). Thereafter, the calling terminal waits a predefined period of time (such as 10 or 15 seconds) and submits a second call to the called site (step 4). This process may be repeated as many times as desired whereby the calling terminal allows the phone at the called terminal to ring a predefined number of times, followed by a set pause interval, followed by another call (steps 6 and 7).

Table 2 illustrates the sequence followed by a called terminal.

TABLE 2

| Step 1. | Monitor Phone For Ring |
| Step 2. | Count Number Of Rings |
| Step 3. | Initiate Timer After Third Ring |
| Step 4. | Monitor Phone For New Ring |
| Step 5. | Stop Timer When Phone Rings Again In Allotted Time, Else Reset |
| Step 6. | Count Number Of Rings |

TABLE 2-continued

| Step 7. | Repeat Steps 2–6 If Desired |
| Step 8. | ... |
| Step 9. | If Correct Pattern Of Rings And Delays Exists Answer Phone, Else Reset |
| Step 10. | Transfer E-Mail And Data Files |

Initially, the called site monitors the phone for a ring (step 1) and this predefined sequence of ring(s) (step 2) and intervening pause(s) (steps 3–5) and answers the phone after the proper sequence is received (step 9). For instance, the called terminal notes the first call with the predefined number of rings. If the call halts after this preset number of rings, the called terminal thereafter initiates a counter (step 3). If a second call is not received within the allotted time (such as 10 or 15 seconds), the called terminal identifies the call as one from an unidentified source and thus resets itself (step 5). However, if a second call is received within the allotted time and (optionally) a second preset number of rings is received (step 6), the called site identifies the call as one coming from a related communications site. Hence, the called site answers the phone to establish a communications link 20–28.

Once a communications link is established, the calling terminal carries out three primary types of communications, namely identification with respect to the called and calling terminals, transmission of messages to the called site and a request for messages from the called site. These functions are performed according to the steps set forth below in Table 3.

TABLE 3

| Step 1. | Once Link Is Established, Pass Confirmation Data Packets Between The Calling And Receiving Sites To Confirm That Both Parties Are Configured To Process E-Mail |
| Step 2. | Request Identification Information From Receiving Site |
| Step 3. | Evaluate Received Site ID Block To Confirm That Site Is Valid And To Determine Whether Receiving Site Is A Source Or Clone Site |
| Step 4. | Evaluate Calling Site ID Block To Confirm That Site Is Valid And to Determine Whether Calling Site is a Source or Clone Site |
| Step 5. | Establish Allowable Level Of Communications Between Sites Based on the Site Type |
| Step 6. | Poll Receiving Site to Inquire Whether the Receiving Terminal Contains any New Messages and/or Data files Directed to the Calling Terminal and If so How Many |
| Step 7. | If the Receiving Site Contains New Messages and/or Data Files for the Calling Terminal, Request the First One |
| Step 8. | If the Newly Received Communications Packet from the Receiving Terminal Constituted a Message, Poll the Receiving Terminal to Inquire Whether a Data File is Attached to the Message |
| Step 9. | If a Data File is Attached to the Message, Request the Data File |
| Step 10. | Repeat Steps 7–9 Until No More Messages or Data Files Exist Within the Receiving Terminal Directed to the Calling Terminal |
| Step 11. | Check Calling Terminal's Outgoing Queue for Messages and/or Data Files Directed to the Receiving Terminal |
| Step 12. | If the Outgoing Queue Contains any Messages and/or Data Files Directed to the Receiving Terminal, Direct the Receiving Terminal to Prepare to Receive a Communications Packet |

TABLE 3-continued

| | |
|---|---|
| Step 13. | Transmit a Signal Informing the Receiving Terminal that a Communications Packet is to Follow, Including the Type of Packet |
| Step 14. | Wait for a Ready Signal from the Receiving Terminal and, Once Accepted, Transmit the Message and/or Data File |
| Step 15. | Repeat Steps 13 and 14 Until the Outgoing Queue Contains No More Packets Directed to the Receiving Terminal |
| Step 16. | Inform the Receiving Terminal That the Communication Has Ended |
| Step 17. | Disconnect Phone Link |

Once the Receiving terminal answers the phone, the calling and receiving terminals pass confirmation data packets (step 1) to confirm that both terminals are configured according the present communications network. These packets include essential information such as the serial numbers of both sites, the site names, the versions of the communications packages configured on each terminal, the platform on which the application is running (i.e., "Windows", "Windows NT", "Macintosh", etc.), and general site information (i.e., phone numbers, name of user, etc.). The data packets may be exchanged according to a variety of well-known protocols, such as SMTP (simple message transport protocol for TCP/IP) as defined in RFC 821, with associated message format descriptions in RFC 822 (Request for Comments). This protocol is the standard protocol for the "Internet". Next, the calling site transmits an ID request packet to the receiving site to request the serial number of the receiving site. As noted above, called and calling sites are identified based upon unique serial numbers recorded within the identification block 41. Responsive to this request, the receiving terminal transmits the complete content of the identification block 41 to the calling terminal. The serial number and security codes are read from the ID block and checked according to the CRC algorithm used to create the ID block in order to confirm that the block is valid (i.e., the CRC code corresponds to the source and clone IDs and the salt code in the ID block. If valid, the serial number is read by the calling terminal to determine the type of the receiving terminal. This validation is repeated for the calling terminal to confirm that it is a valid site. Next, the calling terminal tests its own serial number to determine the amount of communication allowed between the terminals. For instance, if a clone/child site communicates with another clone/child site, the terminals are afforded limited communications abilities, such as short messages, non-peak communications times and the like. However, when a source/ parent site communicates with another source/parent site or with a clone/child site, the communicating terminals are afforded full communications capabilities. Thus, in steps 2–5 of Table 3, the calling terminal determines if one of the terminals is a source terminal, and tailors the types of communications based on this determination.

Once the terminal types are identified, the calling terminal polls the called terminal to inquire as to whether the called terminal contains any new messages to be transmitted to the calling terminal (step 6). Responsive thereto, the called terminal searches its outgoing queue of messages to be transmitted to other sites for any messages tagged to be sent to the calling terminal. Thereafter, the called terminal returns a communications packet indicating whether or not any messages exist in its outgoing queue addressed to the calling terminal. Within this communications packet, the called terminal further identifies the number of outgoing messages if any exist. Next, the calling terminal transmits a communications packet directing the called terminal to transmit the first message within the outgoing queue addressed thereto (step 7).

Upon receipt of this command, the called terminal transmits the identified message, followed by a command identifying the end thereof. Next, the calling terminal transmits a communications packet to the called terminal inquiring as to whether any data files were attached to the most recently received message (step 8), and if so, it requests these data files (step 9). Responsive thereto, the called terminal transmits any attached data files, followed by an end command. If additional messages and/or data files exist in the outgoing queue addressed to the calling terminal, the calling terminal repeats the foregoing polling commands to obtain each message and data file from the called terminal (step 10).

Once the last message and/or data file is received, the calling terminal checks its outgoing queue to determine if any messages exist in the calling terminal's outgoing queue directed to the called terminal (step 11). Next, the calling terminal transmits a message directing the called terminal to prepare to receive incoming messages and/or data files (step 12). Next, the calling terminal transmits a message informing the called terminal that the first outgoing message and/or data file and its type will follow (step 13). When the calling terminal receives a ready signal, the message and/or data file is transmitted, followed by an ending message (step 14). The calling terminal repeats this process until all outgoing messages are transmitted (step 15). Thereafter, the calling terminal disconnects the communications link (steps 16 and 17).

When a terminal receives messages and/or data files from another terminal, the received messages are stored in the incoming queue 23. Similarly, when a terminal transmits messages and/or data files to any other terminals, the transmitted messages are deleted from the outgoing queue 25 after being sent to every destination terminal.

Once a called terminal receives a new message and/or data file from another terminal, the called terminal indicates receipt of this new message to the user by flashing an LED on the keyboard, such as the Scroll Lock LED. In this manner, the user is able to identify receipt of new mail messages without turning on the monitor. The structure and processing sequence necessary to control the scroll lock LED is explained below.

The graphics interface 11 includes a plurality of timers which may be initialized to call periodically an equal plurality of predefined functions. At installation, the application package 3 initializes a timer within the graphics interface (hereafter the New Mail Interrupt or NMI) and sets the timer to call a desired function at predefined intervals (such as every 1.5 seconds). In the preferred embodiment, the function called by the New Mail Interrupt controls the state of the Scroll Lock LED based on the existence of new mail messages.

The interrupt interval identifies how often the CPU calls the desired function. The interval between calls may vary as preferred by the user and, optionally, may be adjusted by the operator.

Figure 2:
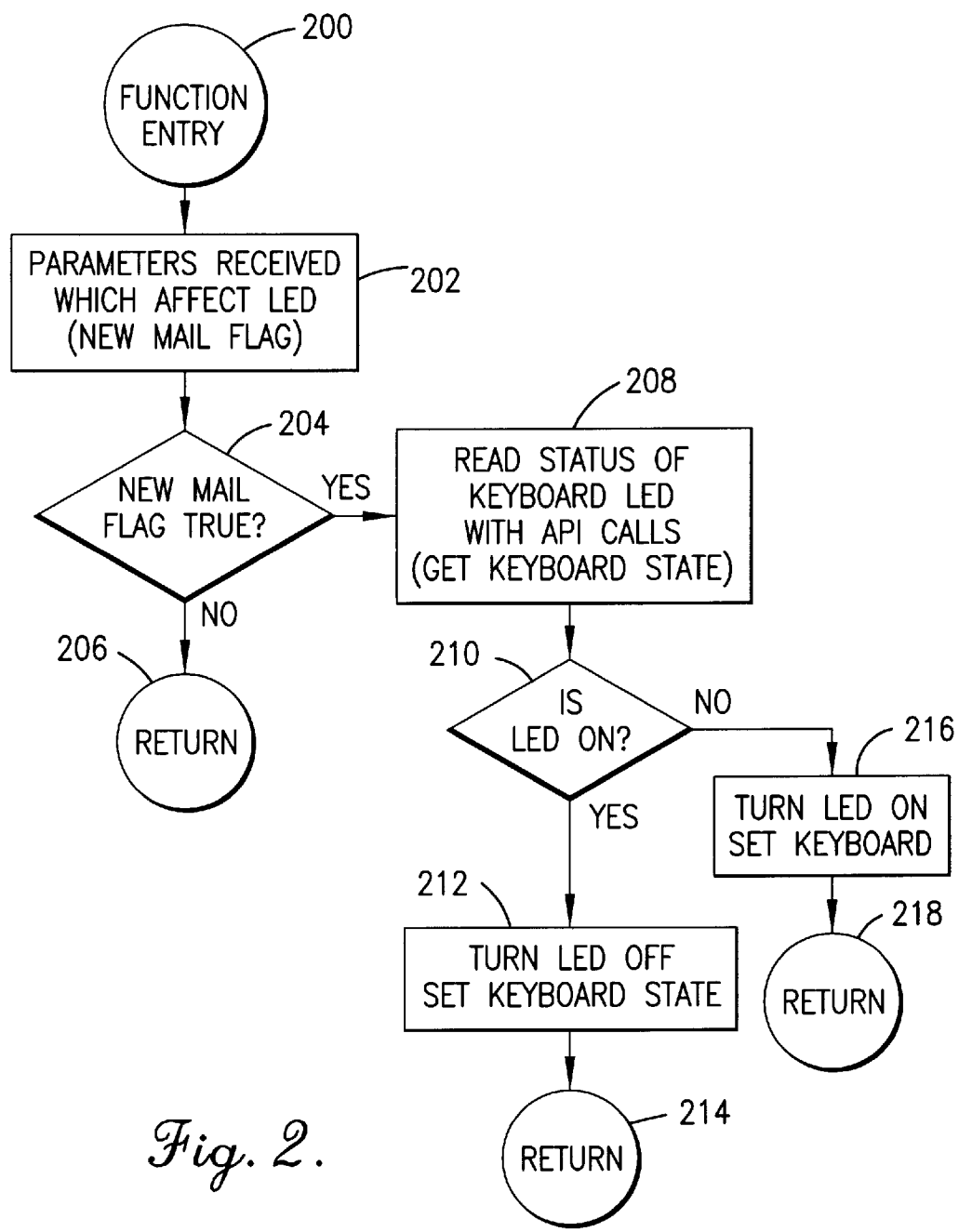
FIG. 2 illustrates a block diagram of a logic flow for an LED control function utilized to turn ON and OFF at least one of the Num Lock LED, Caps Lock LED and Scroll Lock LED upon the keyboard.

FIG. 2 illustrates the processing sequence (hereafter the "LED control function") performed at set intervals when called by the New Mail Interrupt. When called (step 200), the LED control function reads a global or system variable or flag identifying incoming mail (step 202) and evaluates the state of the Flag (true or false) (step 204). If the new mail Flag is false, no new mail has been received and thus control returns to the normal routine being conducted prior to the interrupt (step 206). Alternatively, if new mail exists (i.e., if the new mail Flag is true), the controller reads the status of the scroll lock LED (step 208). If the LED is ON (step 210), the controller turns the LED OFF (step 216). Alternatively, if the LED is already OFF (step 210), the controller turns the LED ON (step 212). In this manner, the LED control function of FIG. 2 changes the state of the scroll lock LED each time the function is called, so long as the New Mail Flag is true. Once the LED state is changed, control returns to the main program, from which the interrupt occurred (steps 214 and 218). This LED control function is performed at set intervals (such as every 2 seconds), and thus when new mail exists, the state of the Scroll Lock LED is alternated between ON and OFF to achieve a blinking effect. In the preferred embodiment, the blinking Scroll Lock LED is used to inform the user that new mail has been received without turning the monitor ON.

According to the routine of FIG. 2, the Scroll Lock LED may be controlled to flash at a given rate regardless of the number of new messages. Alternatively, the scroll lock LED may be configured to flash with a sequence of short bursts followed by a long pause, with each of the short bursts indicative of a message. Hence, if three messages are received, the Scroll Lock LED may flash quickly three times followed by a long pause, followed by three quick flashes, followed by a long pause, etc. If a significant number of messages are received, the LED may only flash quickly for a maximum number of messages, such as five. Hence, if ten messages are received, the LED may only flash five quick bursts between long pauses to indicate five messages or more.

As explained below, the flashing LED is turned off once the user reads any of the new messages. As one option, the user need not read all of the new messages in order to turn off the LED. Alternatively, the user may be required to read all of the new messages before turning the LED off.

Figure 4:
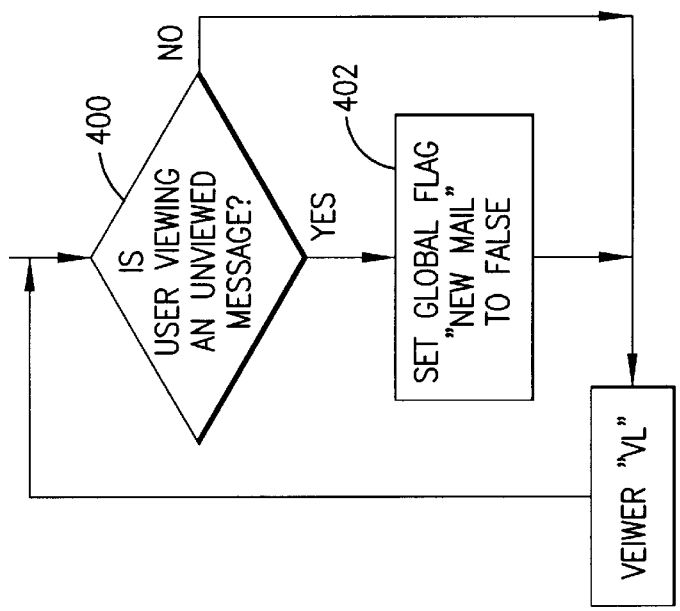
FIG. 4 illustrates a processing sequence followed by the present invention once a newly received message is viewed by the user.
Figure 3:
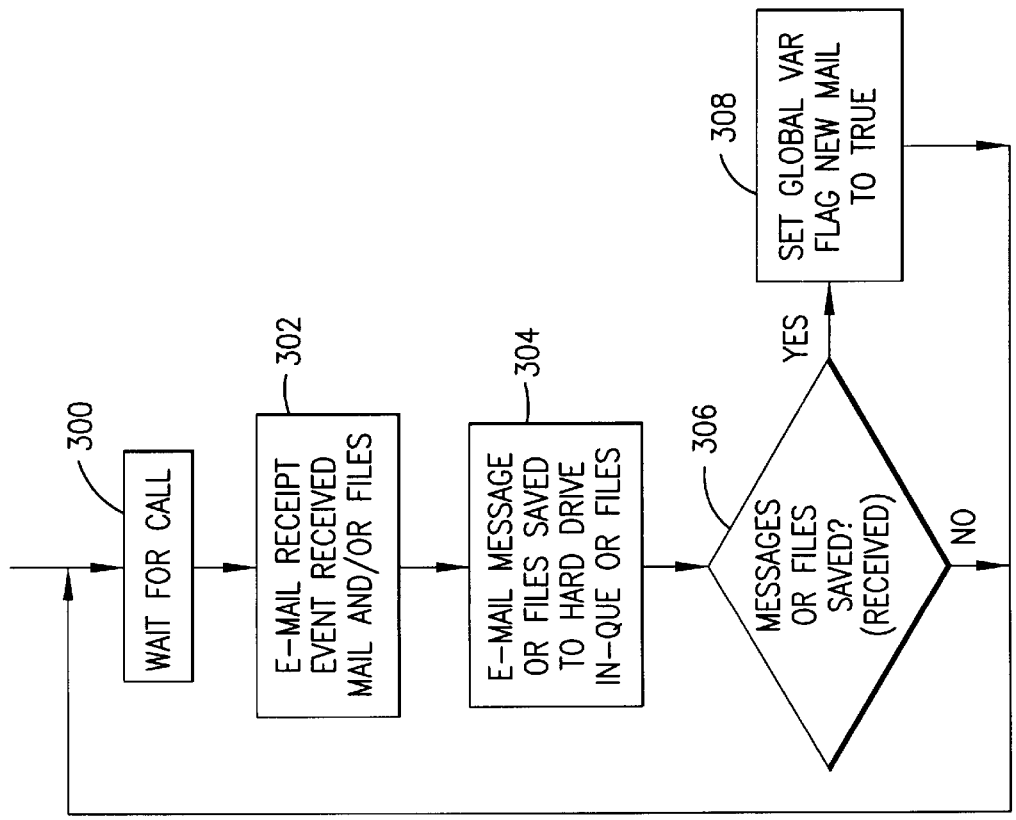
FIG. 3 illustrates a processing sequence followed by the present system when a new mail message is received by a terminal.

FIGS. 3 and 4 illustrate the processing sequences undergone to set and reset the New Mail Flag, and thus to turn the LED control function ON and OFF. The processing sequence of FIG. 3 is performed during or in cooperation with a communications link. In FIG. 2, an initial step 300 is illustrated at which the terminal 2 waits for a new message such as before establishing a communications link with another terminal 2 according to Table 2. Next, the terminal 2 receives a mail message and/or a data file (step 302). Thereafter, the mail messages are saved to the hard drive in the incoming queue 25 and the data files are saved to the hard drive with an identifying header being located in the incoming queue 25 (step 304). Next, the terminal tests the queue 25 or its equivalent to determine whether any new mail messages and/or data files have been received (step 306) during the communications link. If not, control returns to the main routine where at the CPU again waits to transmit or receive a mail message. If a new mail message or file has been saved at step 306, the CPU sets the New Mail Flag to a "true" state to indicate that new mail has been received but not yet read (step 308). Thereafter control returns to the main routine. The processing sequence of FIG. 3 is repeated every time a call is received from another site or initiated at this site.

Turning to FIG. 4, when a user reads at least one new mail message, control passes to step 400 at which the CPU determines whether the user is viewing an unviewed message. If not, control returns to the main control routine. If the user is viewing an unviewed message, control passes to step 402 at which the New Mail Flag is set to a false state to indicate that the user has viewed at least one of the new mail messages and thereafter control returns to the main routine.

As explained above, the LED flashing routine of FIG. 2 is repeated periodically when the New Mail Flag is set in FIG. 3 and is halted when the New Mail Flag is reset in FIG. 4.

As noted above, each source/parent terminal is afforded the ability to produce clone/child packages which, once installed on a terminal, enable the terminal to communicate with all source/parent terminals and (to a limited extent) with all other clone/child terminals.

Table 4 illustrates a processing sequence utilized by a source terminal to create a clone application diskette that is self-installing upon a hard drive to configure a clone terminal.

TABLE 4

| Step 500. | Start Communications Application on Source Terminal |
|---|---|
| Step 502. | Select Cloning or Child Creation Feature |
| Step 504. | Prompt User for Disk Drive, Telephone Link and Disk |
| Step 506. | Inspect Drive for Diskette |
| Step 508. | Inspect Diskette for Sufficient Space |
| Step 510. | Copy Files to Diskette |
| Step 512. | Store Unique Identifier and Security Code for Clone Site |
| Step 514. | Generate "Call Back" Information and Store on Diskette |
| Step 516. | Remove Diskette Containing Clone Application |

As shown in Table 4, once the source terminal is initiated (step 500), a user selects the child creation (cloning) feature (step 502), such as from a menu or with a predefined keystroke. Thereafter, the CPU informs the user that a clone/child diskette is about to be created and, optionally, confirms that this option is desirable. Next, the disk information is obtained from the user (step 504). For instance, the clone/child creation function asked the user which disk drive contains a disk upon which the clone/child communications package is to be stored. Also, the user may be prompted to indicate whether the clone/child copy is to be configured to communicate with other terminals through a local or long distance telephone network. Further, the user may be asked to insert a blank diskette.

Once the disk drive, telephone and diskette information are received in step 504, control passes to step 506 at which the CPU inspects the specified driver to determine whether a diskette is loaded. If so, the loaded diskette is searched to determine whether sufficient space is available to record a clone of the application including the associated files and data base structures (step 508). If sufficient space is available, the CPU copies the application package 3 including the necessary programs, files and data bases from the source terminal's hard drive to the diskette (step 510). The copied materials may be classified in four general areas, namely control executable files which control operation of the communications application, set-up executable files which operate during the self-installing process to transfer the complete communications application from the diskette to the clone/child terminal's hard drive, help system files to assist the user during operation of the communications application and, optionally, dynamic link library files (DLLs) containing functions used by the application program during operation. The DLL files need not be transferred if the clone/child terminal already contains same.

Once the application package 3 is copied from the source terminal's hard drive to the diskette, the source terminal also writes a unique identification block, with security information, onto the diskette (step 512). The ID uniquely identifies the clone/child terminal upon which the copy is installed, while the security information prevents unauthorized modification of an application on disk. Thereafter predefined caller or site information is stored in the database structures on the diskette regarding the source terminal and any other desired terminals with which it is preferable to allow the clone terminal to communicate (step 514). Finally, the user is allowed to remove the diskette containing the clone/child application program (step 516). The user may install the clone program on any type of terminal so long as it has a modem and a compatible graphics/user interface to operate the communications application. Preferably, the interface should be the same as used on the parent terminal.

Figure 5:
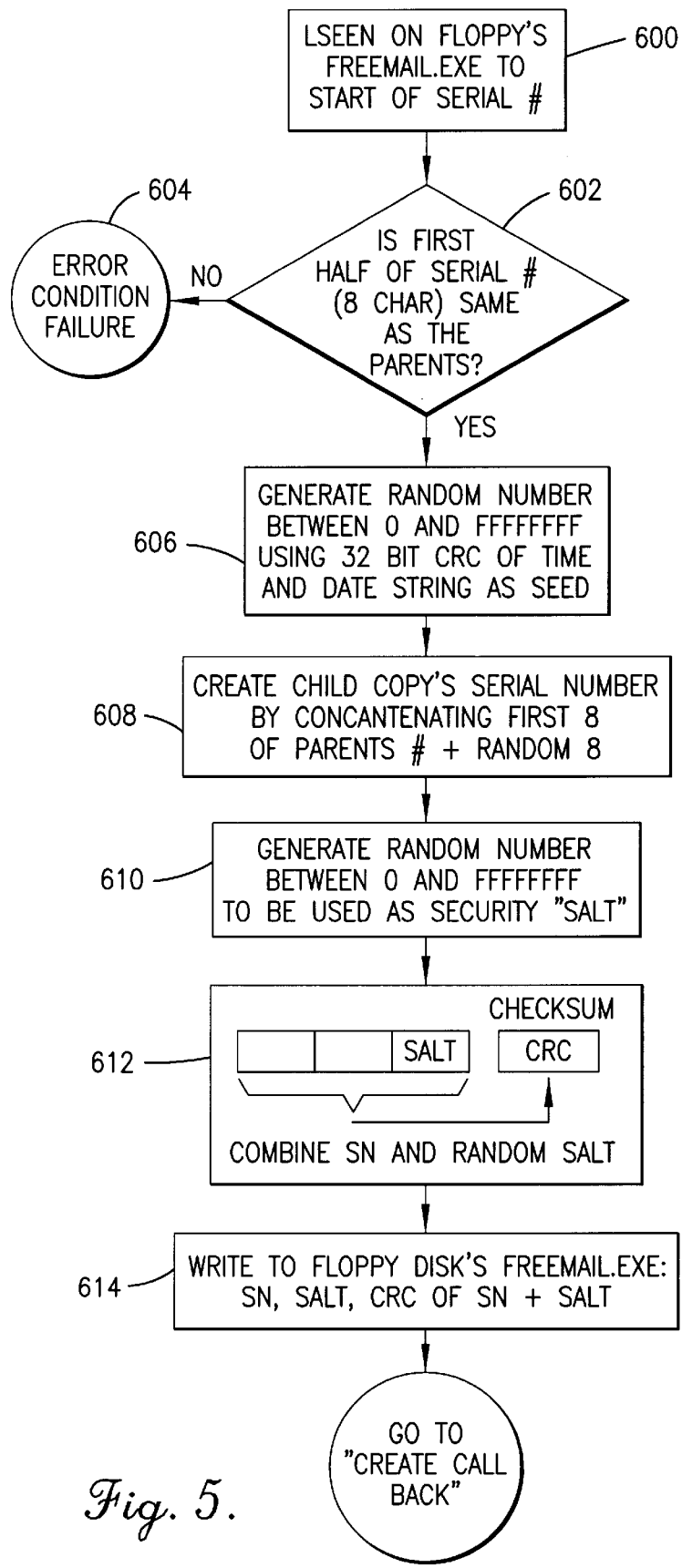
FIG. 5 illustrates the processing sequence in more detail followed by the present invention when creating a unique identifier for a clone child terminal.

FIG. 5 illustrates in more detail the sequence followed by the CPU of the source terminal when creating and installing a unique identifier upon a diskette to be utilized later to set up a clone/child terminal (as generally referenced in step 512 of Table 4). The CPU initially conducts a seeking operation to locate the identification block 41, which is stored at a specific address upon the diskette (step 600 of FIG. 5). In particular, the CPU locates the block 41 by combining an offset and a starting address at which the communications package 3 is stored. Thus, for instance if the communications package 3 were stored beginning at address 1000F000, the CPU would add the value of the offset to this starting address to obtain the location of the identification block 41.

Table 5 set forth hereafter illustrates an exemplary general format for the identification block 41.

TABLE 5

| CRC CODE | SALT CODE | SOURCE ID | CLONE ID |
| --- | --- | --- | --- |

As shown in Table 5, the identification block 41 may include a CRC Code, a Salt Code, a source ID and a clone ID stored in consecutive bytes. The CRC Code and Salt Code represent security information used to prevent unauthorized, modifying of a parent or child diskette. The Source ID represents a serial number for the source terminal, from which an application package is created. The Clone ID represents a serial number assigned to a corresponding application package by a source terminal that created the application. If the block 41 represents a source application package, the Clone ID may be empty, may equal the Source ID or may include additional security information. As shown in Table 5, the IDs and the security information are stored in multiple consecutive bytes, such as in 64 bit segments. Alternatively, the IDs and security codes may be located remotely from one another at known offsets with respect to the starting address at which the application package is stores. As a further option, the IDs and security codes may be subdivided into bit or byte length portions and interspersed with one another. For instance, alternate bytes within a 64 bit Clone ID may alternatively stored with the Source ID and/or the CRC and Salt Codes.

Returning to FIG. 5, once the identification block 41 l located at step 600, the CPU reads and analyzes the bytes therein to determine whether the Source ID corresponds to the Source ID stored upon the hard drive of the parent terminal (step 602). Step 602 merely represents an error checking step to confirm that the serial number was properly written to the diskette and to confirm that the CPU has located the starting point of the identification block 41. If the source ID is not validated in step 602, an error condition is identified and the child creation function is halted in step 604. If the source ID is validated, control passes to step 606 at which a random number is generated to create the Clone ID. The random number may represent a 32 bit number between 0 and FFFFFFFF and may be generated based upon a conventional cyclic redundancy checksum (CRC) algorithm which utilizes the current time and date as seeds from which the random number is derived. The CRC algorithm may be one of many conventional routines, such as disclosed in an article entitled "Cyclic Redundancy" by Gregory Louis in *The C Users Journal*, October 1992, Vol. 10, No. 10, pages 55–71, published by R & D Publications, Inc. (incorporated herein by reference).

Once the random number is generated in step 606, a corresponding clone ID is created in step 608. The clone ID may simply equal the random number. Alternatively, the clone ID may be created by combining the random number with the source ID in some predefined manner, such as using the upper half or most significant bits of the source ID and the lower or least significant bits of the random number. By using a portion of the source ID within the clone ID, it will always be possible to determine which source terminal created a clone site (for instance, by designating particular bit sequences for the upper half of source IDs).

Thereafter, a second random number is generated (step 610) representing a security "salt". A security salt represents a random number combined with another number (i.e., an ID) according to a specific CRC algorithm to produce a checksum which is stored with the salt and the ID. A terminal confirms the validity of the ID by using the same algorithm and salt to obtain a test checksum. If the test checksum equals the stored checksum, the ID is valid. In step 612, the parent and child serial numbers and the salt are combined by a predefined CRC algorithm to create a checksum or CRC Code which is also written into a predefined memory space within the application block 41 (step 608).

Once the IDs, salt code and CRC code are combined, these numbers are written to the floppy disk over the IDs, salt code and CRC code copied from the parent terminal's hard drive (step 614). Thereafter, control returns to step 514 in Table 3 at which "call back" information is recorded to the diskette.

Figure 6:
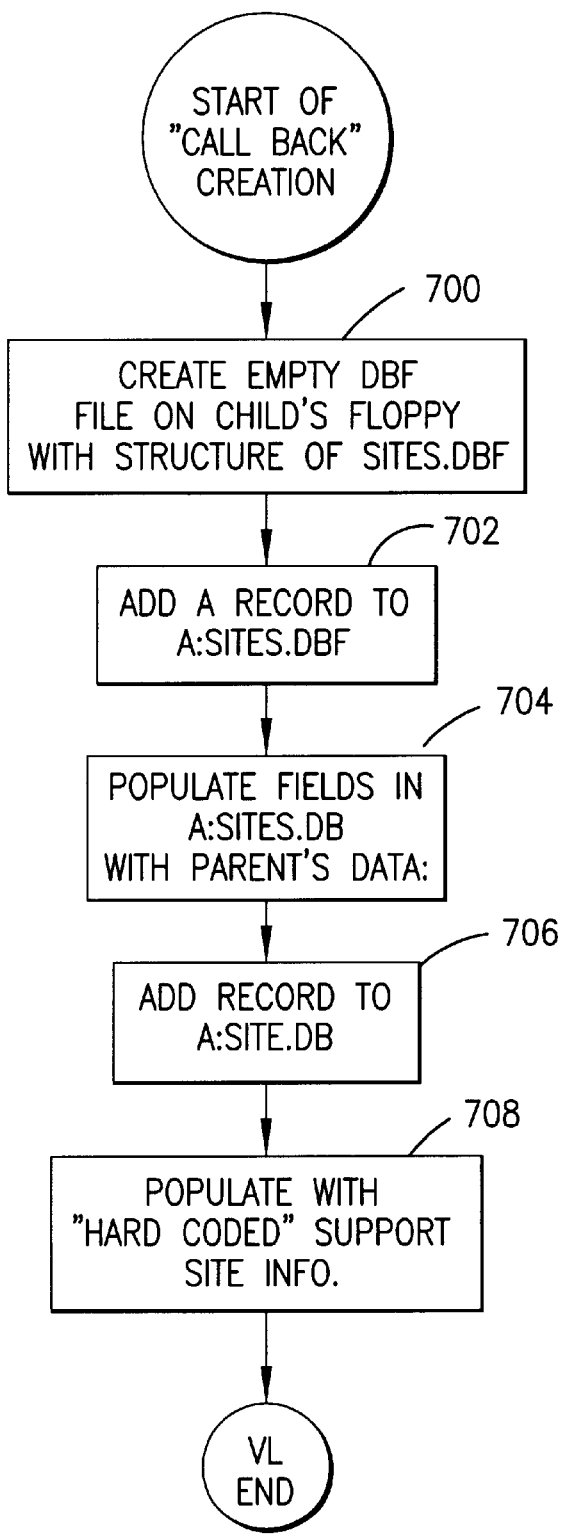
FIG. 6 illustrates the processing sequence followed by the present invention when adding call back information for different sites to a clone/child diskette.

FIG. 6 illustrates the sequence whereby "call back" information is stored upon the diskette in step 514. Initially (step 700), a data base structure is created upon the floppy disk, with this data base corresponding to the data base structure stored upon the source terminal hard drive. By way of example only, this data base structure may include a plurality of records, with each record containing multiple fields of information corresponding to a single site which may be called by the clone application package. Each record includes a plurality of fields, such as a phone number field for the site, an address field, and the like. Thereafter, a source site record is added in step 702 to the data base upon the diskette. The source site record contains site information concerning the source terminal, thereby enabling the clone application package to call the source terminal that created the clone application. Optionally, site records corresponding to additional source and/or clone sites may be written to the diskette (step 704). Further, additional records may be added (step 706) and filled with site information corresponding to support sites (step 708). The support site information enables a user of the clone application to contact technical support assistance, even though the clone application was not purchased directly from the manufacturer of the source application package. Thereafter, control returns to the main sequence in Table 3 and the diskette is removed from the source terminal.

Once the clone diskette is created, the clone application package thereon may be installed upon a terminal by executing the set up routine on the diskette. Once the set up routine is completed, the terminal is configured as a clone site. To configure the terminal as a clone site, the set up routine first checks the system resources such as determining the existence of source files upon the diskette, determining whether sufficient disk space exists on the destination hard drive and identifying the operating system of the destination system. Thereafter, the child application explains to the user that it is about to create an electronic communications application upon the terminal and confirms that such configuration is desirable. Thereafter, the user is prompted for a destination directory at which the application block is to be stored. Next, the application block upon the floppy disk is stored in the destination directory upon the hard drive of the terminal to be configured and a "program group" is created within the graphics interface such as the program manager in "Windows" by Microsoft. Thereafter, program items corresponding to the electronic mail application are written to the program group, in order that the user may initiate and operate the communications application through the windows interface.

Thus, by copying the setup routine to the diskette with the application block, the present application becomes "self-installing". In other words, once a clone diskette is created by a source site, the clone diskette may be installed in any compatible terminal without separate intervention by the user or manufacturer of the source application.

From the foregoing it will be seen that this invention is one well adapted to attain all ends and objects hereinabove set forth together with the other advantages which are obvious and which are inherent to the structure.

Optionally, a source application may be constructed to create additional source applications.

As a further option, the Scroll Lock LED may be controlled to flash in a variety of sequences to identify different features of the system. For instance, the scroll locking LED may be controlled to flash at different rates depending upon the priority of the message received. Also, the scroll locking LED may be controlled to flash in multiple colors or in combination with the Caps Lock LED and the Nums Lock LED. A variety of signals may be illustrated to the user depending upon the sequence of flashes and depending upon which of the Nums Lock, Caps Lock and Scroll Lock LEDs may be flashed in connection with a variety of applications other than electronic mail applications.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In an electronic mail network comprising at least a source terminal and at least one clone terminal coupled together via a communications link, each of said terminals comprising a CPU, a disk drive, and a memory, the source terminal including, in memory, a source comunications package containing a source identifier uniquely identifying the source terminal from other terminals within the network, the source communications package managing and controlling communications of the source terminal upon the network, a method for producing a clone communications package operative upon a clone terminal to enable said clone terminal to communicate upon the network, said method comprising the steps of:

activating a cloning feature at the source terminal within the source communications package;

copying the source communications package, from the source terminal, to a clone disk in the disk dxive; and writing a clone identifier to the disk over the source identifier contained with the copy of the source communications package on the disk to convert the copy of the source communications package to a clone communications package to be installed on a clone terminal to identify the clone terminal uniquely within the network, wherein said step of writing the clone identifier to the disk comprises the substeps of:

locating an identification block containing a source identifier within the communications package stored on the disk;

determining whether said identification block contained a source identifier corresponding to the source communications package;

creating the clone identifier uniquely identifying the communications package stored on the disk; and writing said clone identifier to said identification block on the disk over the source identifier within said identification block.

2. In an electronic mail network, a method according to claim 1, further comprising the steps of:

copying a set-up package to the disk, along with the communications package, said set-up package being activated when the disk is inserted in the clone terminal, said set-up package automatically installing the clone communications package on the disk upon the clone terminal.

3. In an electronic mail network, a method according to claim 1, further comprising the step of:

writing call-back information to the disk, said call-back information including data identifying source and clone terminals connected to said network and including connection and terminal configuration data to enable a terminal upon which the clone communications package is installed, to call and communicate with remote source and clone terminals identified by the call-back information.

4. An electronic mail network, according to claim 1, further comprising the steps of:

copying security code information related to the source identifier and contained in the source communications package;

modifying said security code information within the clone communications package on the disk based on the clone identifier written to the disk, said security code preventing unauthorized modification of a communications package.

5. In an electronic mail network, a method according to claim 1, wherein said step of writing the clone identifier to the disk includes the further substeps of:

generating a security salt code;

combining the security salt and the clone identifier; and writing the combination of the clone identifier and security salt to the identification block to provide a secure identification block uniquely identifying the communications package as a clone comnunications package.

6. In an electronic mail network, a method accordingly to claim 1, further comprising the steps of:

creating a database upon the disk, having a structure corresponding to a structure of a database upon the source terminal used by the source communications packages;

adding at least one record to the database on the disk, said record containing information enabling communication with a remote terminal which may be called by the clone communications package.

7. A machine for reproducing a source communications package thereon to produce a clone communications package to be installed upon a remote computer terminal, said clone communications package configuring said remote terminal to operate as a remote communications terminal within a communications network which attaches a plurality of terminals to one another, each terminal containing one of a source and clone communications package enabling the terminal to use the network, said machine comprising:

a CPU;

memory;

a communications package, stored in memory, which controls and manages incoming and outgoing electronic messages received from and transmitted upon the network, said source communications package including source identifying means for uniquely identifying the source package from all other communications packages in the network;

a disk drive for reading and writing data, including the source identifying means, to a disk; and means for changing the source identifying means upon the disk to clone identification means which uniquely identifies the clone communications package within the network, said changing means including: means locating an identification block containing a source identifier within the communications package stored on the disk; means determining whether said identification block contained a source identifier corresponding to the source communications package; means creating the clone identifier uniquely identifying the communications package stored on the disk; and means writing said clone identifier to said identification block on the disk over the source identifier within said identification block.

8. A machine according to claim 7, wherein the source and clone identification means include source and clone identification blocks, respectively, stored at predefined locations within corresponding communications packages, each identification block containing a unique identifier for a corresponding source or a clone package and containing a unique security code associated therewith.

9. A machine according to claim 7, further comprising:

means for copying a set-up routine from the source communications package to the disk to enable the clone communications package to be self-installing upon a remote terminal when loaded therein.

10. A machine according to claim 7, wherein the network contains non-dedicated phone lines, said machine further comprising:

a modem for communication over the non-dedicated phone line; and link establishing means for directing the modem to produce a predefined sequence of rings, subsets of which are separated by at least one preset delay, said subsets of rings and preset delays uniquely identifying the call to a remote receiving terminal as being established by a terminal within the network.

11. A machine according to claim 7, wherein the network includes non-dedicated phone lines, said machine further comprising:

a modem for receiving incoming calls;

means for monitoring a number of rings within each call;

means for monitoring a time period between calls; and means for identifying an incoming call as one from a related terminal within the network when a preset number of rings is detected separated by at least one preset delay.

12. A machine according to claim 7, further comprising:

a keyboard having a visual indicator thereon; and means for causing said visual indicator to blink when a predefined condition exists within the communications package.

* * * * *